(12) United States Patent
Lehoux

(10) Patent No.: US 9,809,484 B2
(45) Date of Patent: Nov. 7, 2017

(54) BOTTLE CUTTER

(71) Applicant: Patrick Lehoux, Sudbury (CA)

(72) Inventor: Patrick Lehoux, Sudbury (CA)

( * ) Notice: Subject to any disclaimer, the term of this patent is extended or adjusted under 35 U.S.C. 154(b) by 444 days.

(21) Appl. No.: 13/915,321

(22) Filed: Jun. 11, 2013

(65) Prior Publication Data

US 2013/0333542 A1   Dec. 19, 2013

Related U.S. Application Data

(60) Provisional application No. 61/661,386, filed on Jun. 19, 2012.

(51) Int. Cl.
   *C03B 33/14*   (2006.01)
   *C03B 33/095*  (2006.01)

(52) U.S. Cl.
   CPC ............ *C03B 33/14* (2013.01); *C03B 33/095* (2013.01); *Y10T 83/0215* (2015.04)

(58) Field of Classification Search
   CPC ............ Y10T 83/0215; Y10T 83/0222; Y10T 83/0304; Y10T 83/0363; B23D 21/08; C03B 33/14; C03B 33/095
   See application file for complete search history.

(56) References Cited

U.S. PATENT DOCUMENTS

| | | | | |
|---|---|---|---|---|
| 1,130,395 A | * | 3/1915 | Gilmour | B23D 21/08 30/100 |
| 1,169,579 A | * | 1/1916 | Strauss | B23D 21/08 30/101 |
| 1,173,496 A | * | 2/1916 | Elzay | B23D 21/08 30/100 |
| 1,448,877 A | * | 3/1923 | Smith | B23D 21/10 30/94 |
| 1,652,221 A | * | 12/1927 | Trout | B67B 7/18 81/186 |

(Continued)

FOREIGN PATENT DOCUMENTS

WO   2007129877 A2   11/2007

OTHER PUBLICATIONS

Greenpowerscience, (Feb. 28, 2010), Wine Bottle Cutter 30 seconds Perfect Edge Glass Bottle Cutting GreenPowerScience Guitar Slide, avaiable on Sep. 30, 2015, at : https://www.youtube.com/watch?v=sFXngPx3w3M.*

(Continued)

*Primary Examiner* — Jonathan Riley
(74) *Attorney, Agent, or Firm* — Neal, Gerber & Eisenberg LLP

(57) ABSTRACT

A bottle cutter has a body having two generally arcuate components connected to each other by straight parallel members permitting one component to slide relative to the other component between an open, non-cutting position and a closed, cutting position. Each arcuate component includes a plurality of an inwardly facing rollers that facilitate rotation of a bottle held by the bottle cutter in the closed, cutting position. A cutting wheel disposed on one of the two components cuts, or at least scores, the bottle as the bottle is rotated. If the bottle is only scored, separation of the top and bottom portions of the bottle may be effected using hot and cold water to induce differential thermal stresses in the glass. The edge may be finished or polished using sandpaper or any other suitable abrasive material.

18 Claims, 16 Drawing Sheets

(56) References Cited

U.S. PATENT DOCUMENTS

| | | | | |
|---|---|---|---|---|
| 1,737,889 | A * | 12/1929 | McKnight | B23D 21/08 30/99 |
| 2,747,275 | A * | 5/1956 | Jonasson | B23D 21/08 30/101 |
| 2,869,413 | A * | 1/1959 | Anderson | F42B 35/02 30/94 |
| 2,937,440 | A * | 5/1960 | Kelly | B23D 21/08 30/101 |
| 2,956,339 | A * | 10/1960 | Jonasson | B23D 21/08 30/101 |
| 3,243,878 | A | 4/1966 | Bjalme et al. | |
| 3,395,493 | A * | 8/1968 | Bonin | C03B 33/06 451/211 |
| 3,403,442 | A * | 10/1968 | Reese | C03B 33/14 30/102 |
| 3,699,829 | A | 10/1972 | Gelfman | |
| 3,744,359 | A * | 7/1973 | Gelfman | C03B 33/14 225/93.5 |
| 3,744,692 | A | 7/1973 | Doyel | |
| 3,845,555 | A | 11/1974 | Hanson | |
| 3,902,643 | A | 9/1975 | Gelfman et al. | |
| 3,938,412 | A * | 2/1976 | Ushkow | B67B 7/92 225/96 |
| 4,493,150 | A * | 1/1985 | Garcia | B23D 21/06 30/97 |
| 6,055,732 | A * | 5/2000 | Hu | B23D 21/08 30/102 |
| 6,345,444 | B1 * | 2/2002 | Gillet | B23D 21/08 30/101 |
| 6,811,477 | B2 | 11/2004 | Funakubo | |
| 7,007,391 | B2 * | 3/2006 | Stoick | B26D 3/169 30/101 |
| D556,528 | S * | 12/2007 | Huang | D8/60 |
| 2010/0127472 | A1 * | 5/2010 | Winefordner | B60B 27/026 280/276 |
| 2010/0154223 | A1 * | 6/2010 | Chiu | B23D 21/08 30/95 |
| 2012/0267047 | A1 * | 10/2012 | Maus | B65H 35/0013 156/306.6 |

OTHER PUBLICATIONS

Office Action dated Aug. 17, 2015, for corresponding Canadian Patent Application No. 2,818,364.
Canadian Office Action for Serial No. 2,818,364, dated Jun. 19, 2014, pp. 1-3.
Office Action issued in connection with Canadian Patent Application No. 2,818,364 dated Oct. 26, 2015. (5 pages).

* cited by examiner

BOTTLE CUTTER

CROSS-REFERENCE TO RELATED APPLICATIONS

This application claims priority from U.S. Provisional Patent Application Ser. No. 61/661,386 filed Jun. 19, 2012.

TECHNICAL FIELD

The present invention generally relates to a glass-cutting tool and, more particularly, to a tool for cutting a glass bottle.

BACKGROUND

Bottle cutting is an art or craft that enables a person to make drinking glasses, vases or other artistic creations from empty glass bottles such as beer bottles, wine bottles, liquor bottles, soft drink bottles, or the like.

A variety of bottle-cutting tools or bottle cutters are known in the art. Some examples of prior-art bottle cutters are disclosed in U.S. Pat. Nos. 3,699,829; 3,744,359; 3,744, 692; 3,845,555; 3,902,643; 6,811,477; and in PCT International Patent Application Publication WO/2007/129877. However, these devices tend to be big, bulky and not aesthetic.

A new and improved bottle cutter that is smaller, easier to use and more aesthetic would thus be highly desirable. Such a bottle cutter is disclosed in the present specification and drawings.

SUMMARY

In general, the present invention relates to a bottle cutter and a method of cutting a bottle using this bottle cutter. The bottle cutter is, in general, made of two generally arcuate components that slide relative to one another to thus open and close the bottle cutter. The bottle cutter is opened to insert a bottle and then closed to tighten the bottle cutter around the bottle. The bottle cutter has rollers to facilitate rotation of the bottle within the bottle cutter. A cutting wheel affixed to one of the components cuts the bottle or at least scores the glass to permit facilitate subsequent separation of a top portion of the bottle from a bottom portion of the bottle.

Accordingly, one aspect of the present invention is a bottle cutter comprising a body having two generally arcuate components connected to each other by straight parallel members permitting one component to slide relative to the other component between an open, non-cutting position and a closed, cutting position. Each arcuate component includes a plurality of rollers disposed along an inside of each component to facilitate rotation of a bottle held by the bottle cutter in the closed, cutting position. A cutting wheel is disposed on one of the two components for cutting the bottle as the bottle is rotated.

Another aspect of the present invention is a method of cutting a bottle using a bottle cutter having two generally arcuate components that slide relative to one another. The method entails opening the bottle cutter by spreading the arcuate components into an opened, non-cutting position, inserting the bottle into the bottle cutter, and closing the bottle cutter by sliding one component relative to the other component to thereby constrain the bottle in a closed, cutting position. The method further entails scoring the bottle using a cutting wheel attached to one of the components by rotating the bottle with the bottle cutter in the closed, cutting position, separating a top portion of the bottle from a bottom portion of the bottle, and finishing a cut edge of the bottom portion of the bottle.

BRIEF DESCRIPTION OF THE DRAWINGS

Further features and advantages of the present technology will become apparent from the following detailed description, taken in combination with the appended drawings, in which.

It will be noted that, throughout the appended drawings, like features are identified by like reference numerals.

DETAILED DESCRIPTION

Figure 1:
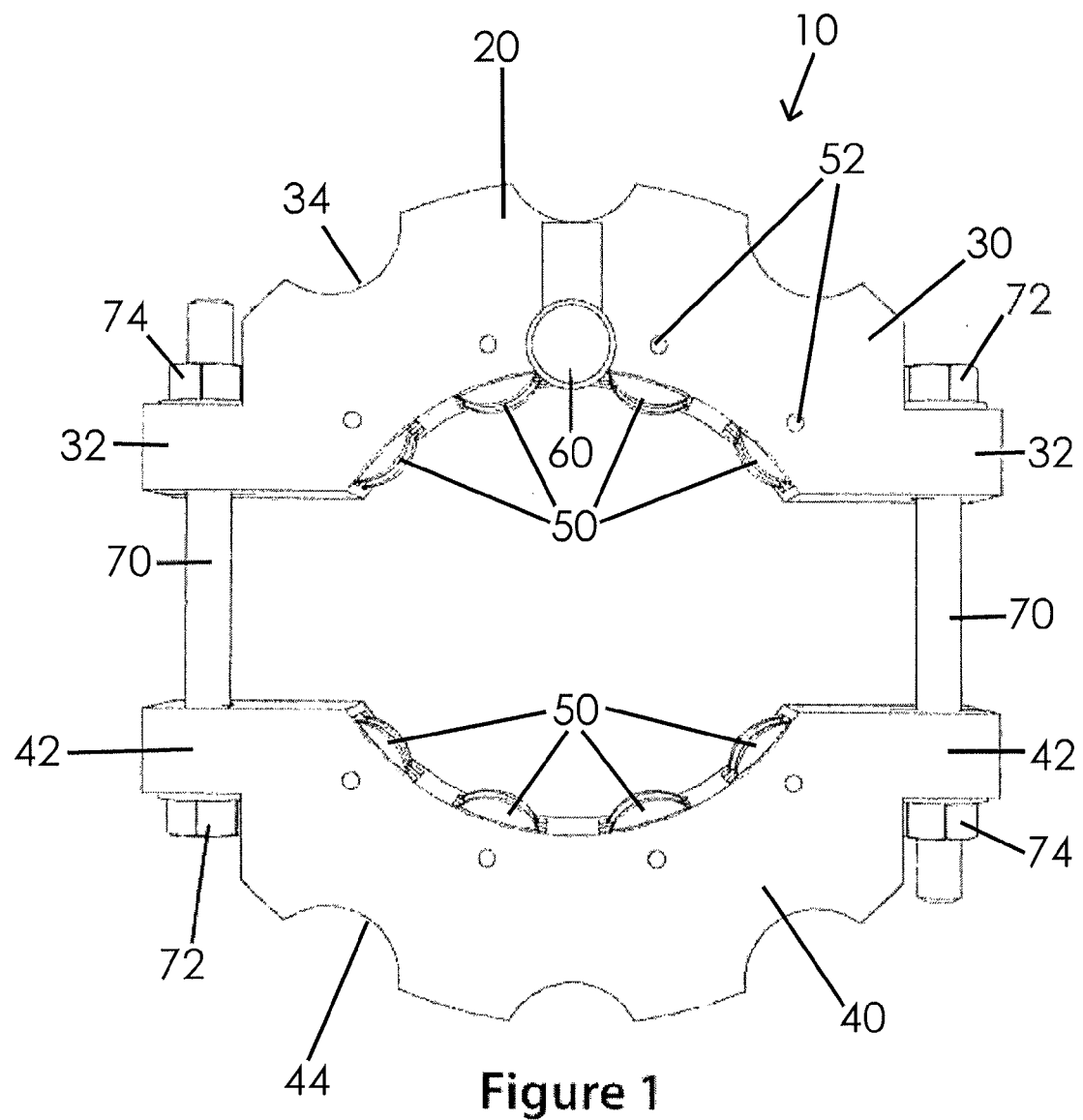
FIG. 1 is front view of a bottle cutter in accordance with a first embodiment of the present invention.
Figure 2:
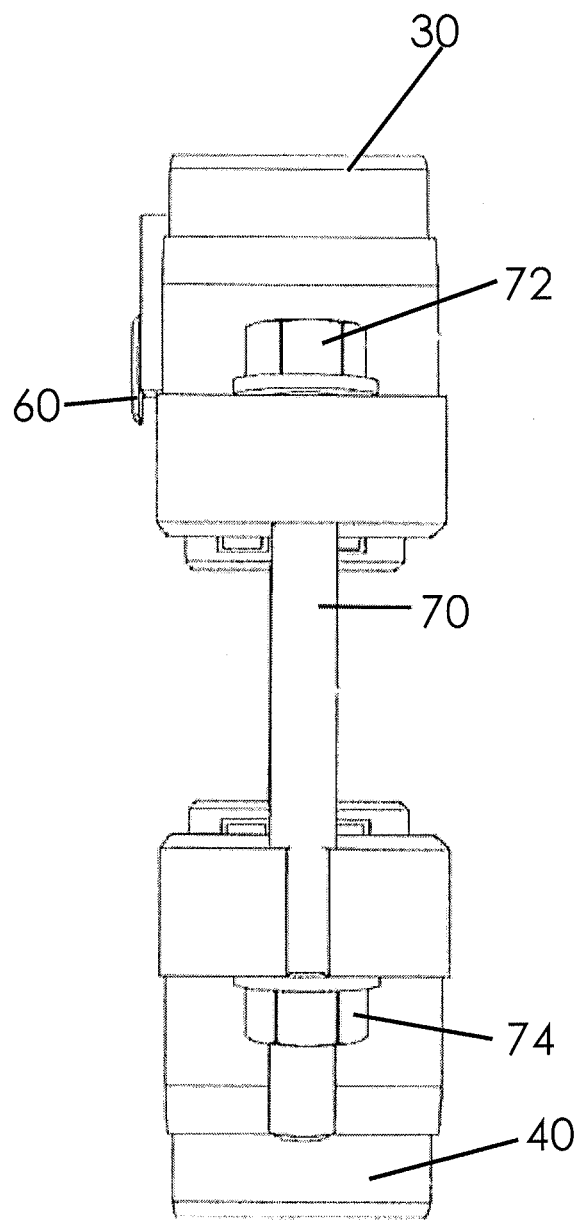
FIG. 2 is a right side view of the bottle cutter of FIG. 1.
Figure 3:
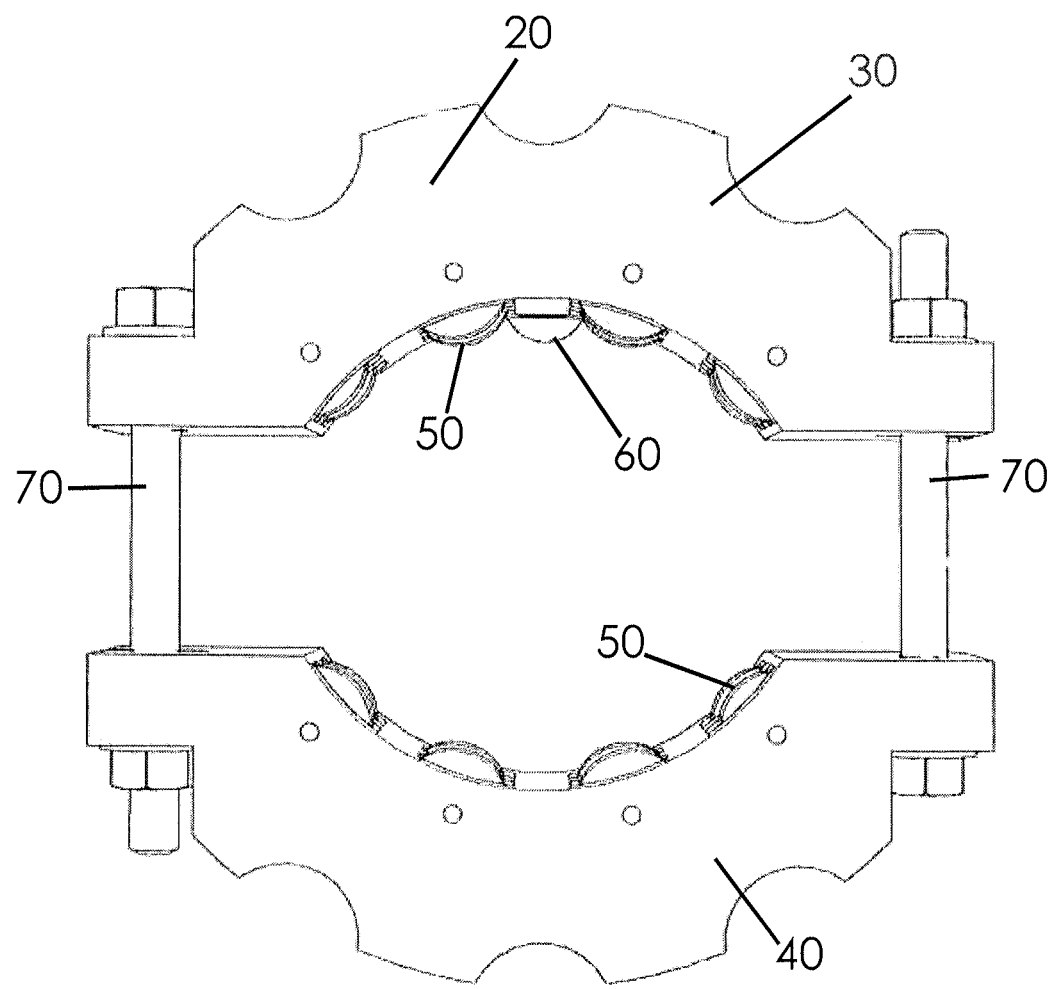
FIG. 3 is a rear view of the bottle cutter of FIG. 1.
Figure 4:
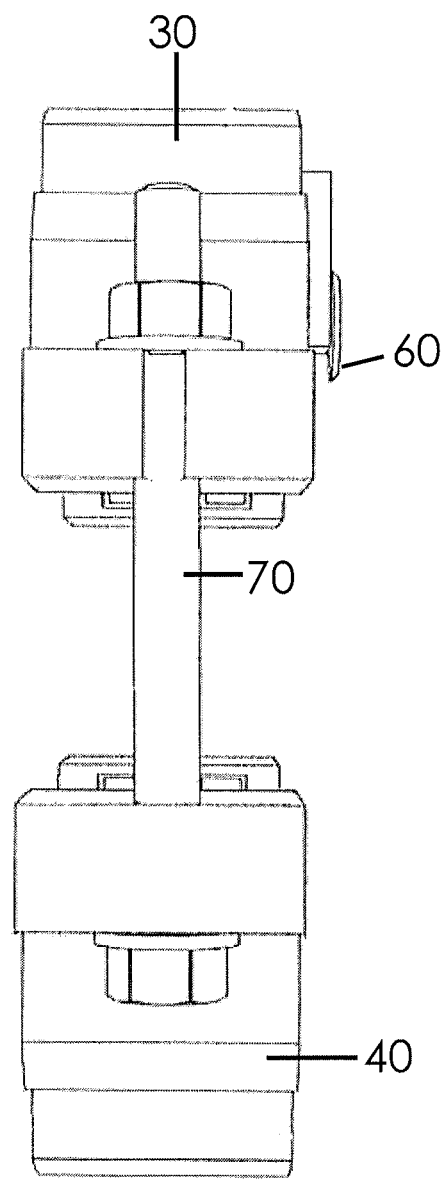
FIG. 4 is a left side view of the bottle cutter of FIG. 1.
Figure 5:
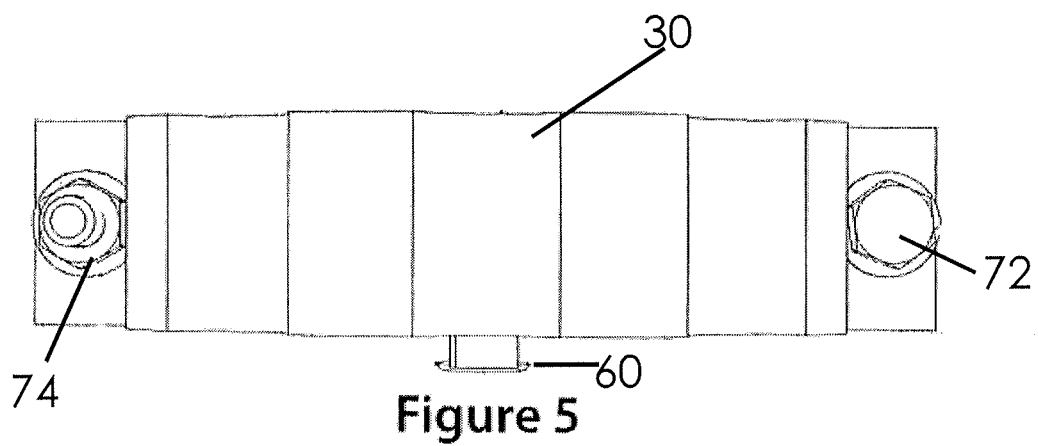
FIG. 5 is a top view of the bottle cutter of FIG. 1.
Figure 6:
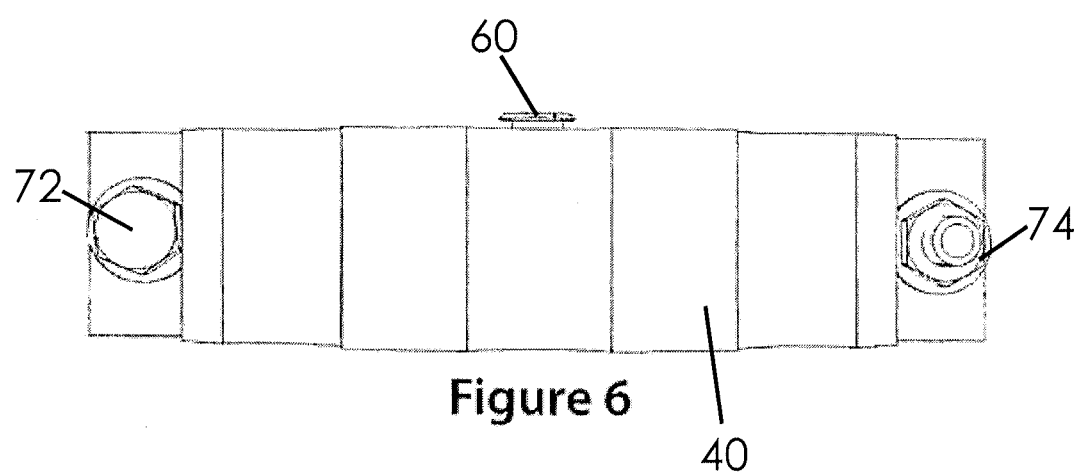
FIG. 6 is a bottom view of the bottle cutter of FIG. 1.

By way of general overview, the present invention provides a bottle cutter and a method of cutting a bottle. The bottle cutter is, in general, made of two generally arcuate components that slide relative to one another to open and close the bottle cutter. To insert a bottle, the bottle cutter is opened (or spread) by sliding one component away from the other component. Once a bottle has been inserted, the cutter is closed by sliding one component toward the other until flange-like extensions of these components abut. The bottle cutter has rollers on a curved inside section of each component to facilitate rotation of the bottle within the bottle cutter. A cutting wheel is rotationally affixed to one of the components to cut the bottle when the bottle is rotated inside the cutter, or to at least score the glass around the outer perimeter of the bottle to facilitate subsequent separation of a top portion of the bottle from a bottom portion of the bottle.

An exemplary embodiment of the bottle cutter is depicted in FIGS. 1 to 8. As depicted by way of example in these figures, a bottle cutter which is generally designated by reference numeral 10 comprises a body 20. The body is composed of two generally arcuate components 30, 40, i.e. a first generally arcuate component 30 and a second generally arcuate component 40. The two components of the body may be made of polymers (thermoplastics or thermosets), metal, composite material, or any other suitable material.

Figure 8:
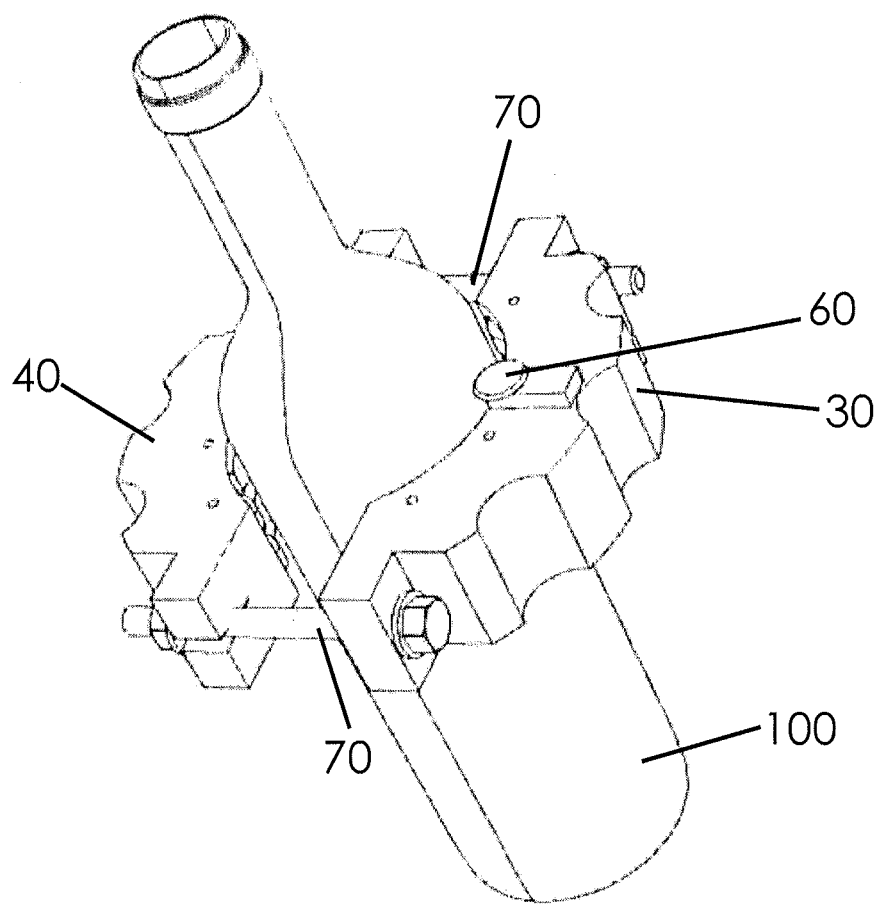
FIG. 8 is a perspective view of the bottle cutter of FIG. 1, illustrated with a bottle in the bottle cutter.

Each component 30, 40 has a plurality of rollers 50 (or wheels) disposed along an inside of the component. In other words, the rollers protrude inwardly into a semicircular inner section of each component. The semicircular inner sections come together to define a generally circular aperture when the two components are brought together into abutment. The rollers are designed to engage the outer surface of the bottle when the cutter is closed around the bottle 100 as best shown in FIG. 8 and thus facilitate the rotation of the bottle within the bottle cutter. In the illustrated embodiment, each component includes four pairs of rollers 50, although it will be appreciated that the number and layout of the rollers may be varied. Each pair of rollers is mounted for rotation on a respective pin 52 that serves as an axle for the each pair of rollers. The pins are arranged parallel to the longitudinal axis of the bottle. The rollers may be made of, or coated with, a rubberized or elastomeric material to provide sufficiently friction on the glass bottle so that the bottle properly rolls over the rollers.

The first component 30 includes a cutting wheel 60 which may be rotationally mounted to the first component as shown in the figures. The cutting wheel rotates about an axis that is also parallel to the longitudinal axis of the bottle and hence parallel to the axis of rotation of the rollers. Alternatively, the cutting wheel may be rotationally mounted to the second component 40. The cutting wheel has a sharp cutting edge designed to cut glass or at least to score the glass to facilitate subsequent separation of a top portion of the bottle from a bottom portion of the bottle. For the purposes of this specification, the expression "cutting" is meant to include "scoring". In another embodiment, the cutting wheel may be replaced by a knife edge, blade or a different type of cutter. In another embodiment, there may be more than one cutting wheel, e.g. one cutting wheel on each component. The cutting wheel may be made of steel, stainless steel or any other suitable metal. Optionally, the cutting wheel may be detachably mounted to the body to permit replacement, cleaning or sharpening of damaged, dirty, or worn (dulled) cutting wheels. Optionally, the cutting wheel may be adjustable or repositionable by locking and unlocking the cutting wheel in one of a plurality of different radial positions.

The two generally arcuate components 30, 40 are connected to each other by straight parallel members 70 permitting one component to slide relative to the other component between an open, non-cutting position and a closed, cutting position. These members act as slide rails for one component to slide relative to the other. It is noted that the direction of sliding is perpendicular to the longitudinal axis of the bottle. Each arcuate component 30, 40 comprises a pair of flange-like extensions 32, 42. Each extension includes a hole having a diameter larger than a diameter of the shaft of the parallel members 70 to permit one component to slide relative to the other component. For example, the hole and shaft of the parallel members may be dimensioned with tolerances to provide a sliding fit.

The parallel members 70 may be fasteners as shown in the illustrated embodiment. Each fastener comprises a bolt head 72 at a first end and a nut 74 at the second end, thereby defining a maximum travel of one component relative to the other component. The fasteners may be bolts with solid smooth cylindrical shafts that are unthreaded over a length corresponding substantially to the length of travel (maximum extensible length). Threads are provided only at the second end of the fastener to receive the nut. Optional washers may be provided beneath the bolt heads and nuts. Optionally, a thread-locking adhesive may be added to the threads to prevent unwanted loosening during usage.

Figure 7:
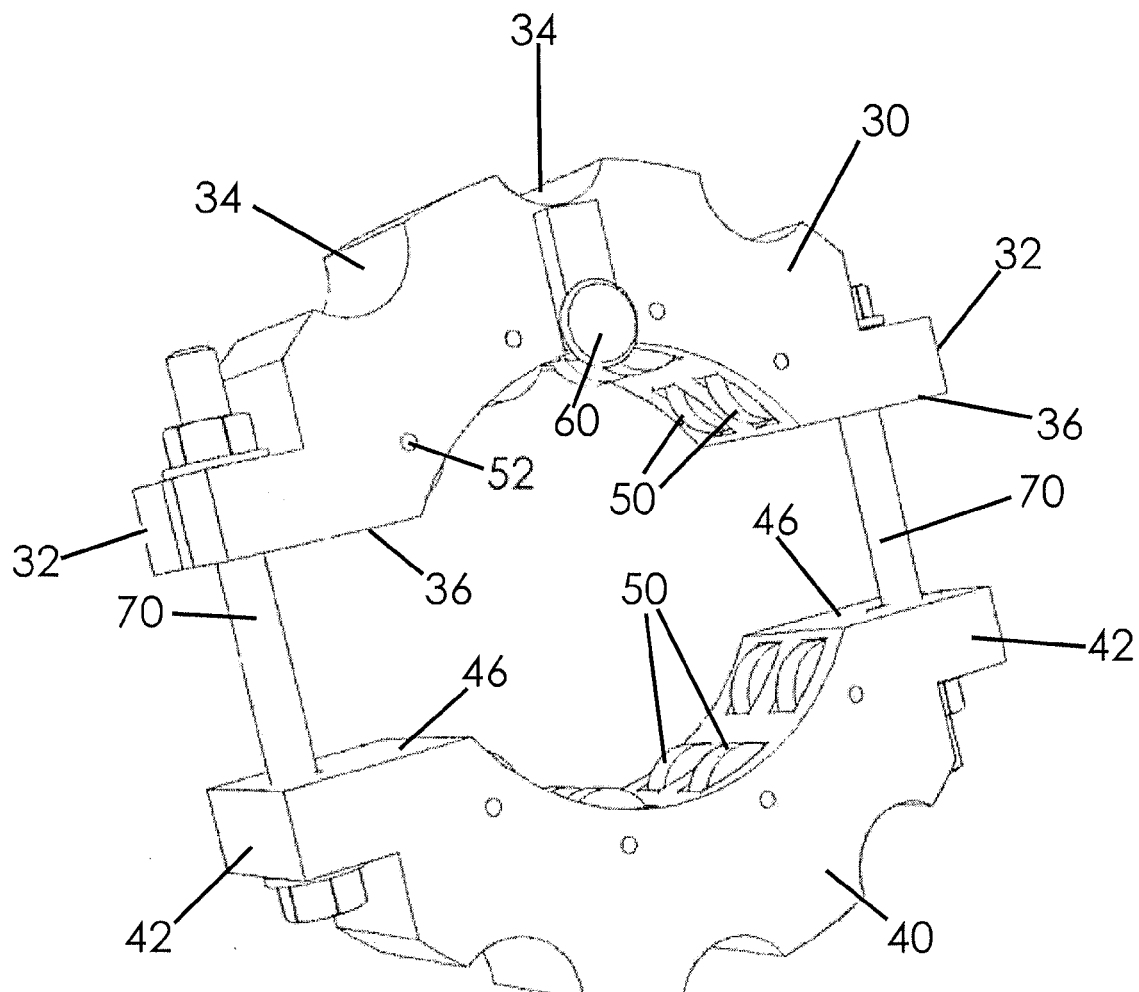
FIG. 7 is a perspective view of the bottle cutter of FIG. 1.

The flange-like extensions 32 of the first component 30 are adapted to abut the flange-like extensions 42 of the second component 40 in the closed, cutting position. In the illustrated embodiment, the flange-like extensions define flat inner surfaces 36, 46 (as best shown in FIG. 7) that abut one another when the cutter is fully closed.

In the closed, cutting position, the inner semicircular sections of the two components together form a generally circular aperture when the inner surface 36, 46 abut. When the two components abut in the closed, cutting position, the four pairs of rollers of each component 30, 40 simultaneously engage the bottle for smooth rotation.

The outer portion of each component may optionally include grooves, notches or indentations 34, 44 for a user to place his fingers so as to provide a better grip on the cutter in operation. The user may thus hold the cutter with one hand and then rotate the bottle with the other hand.

This novel design is compact (thus easy to store), simple to use, and reliable in that it consistently cuts bottles in a safe, predictable and efficient manner.

Figure 9:
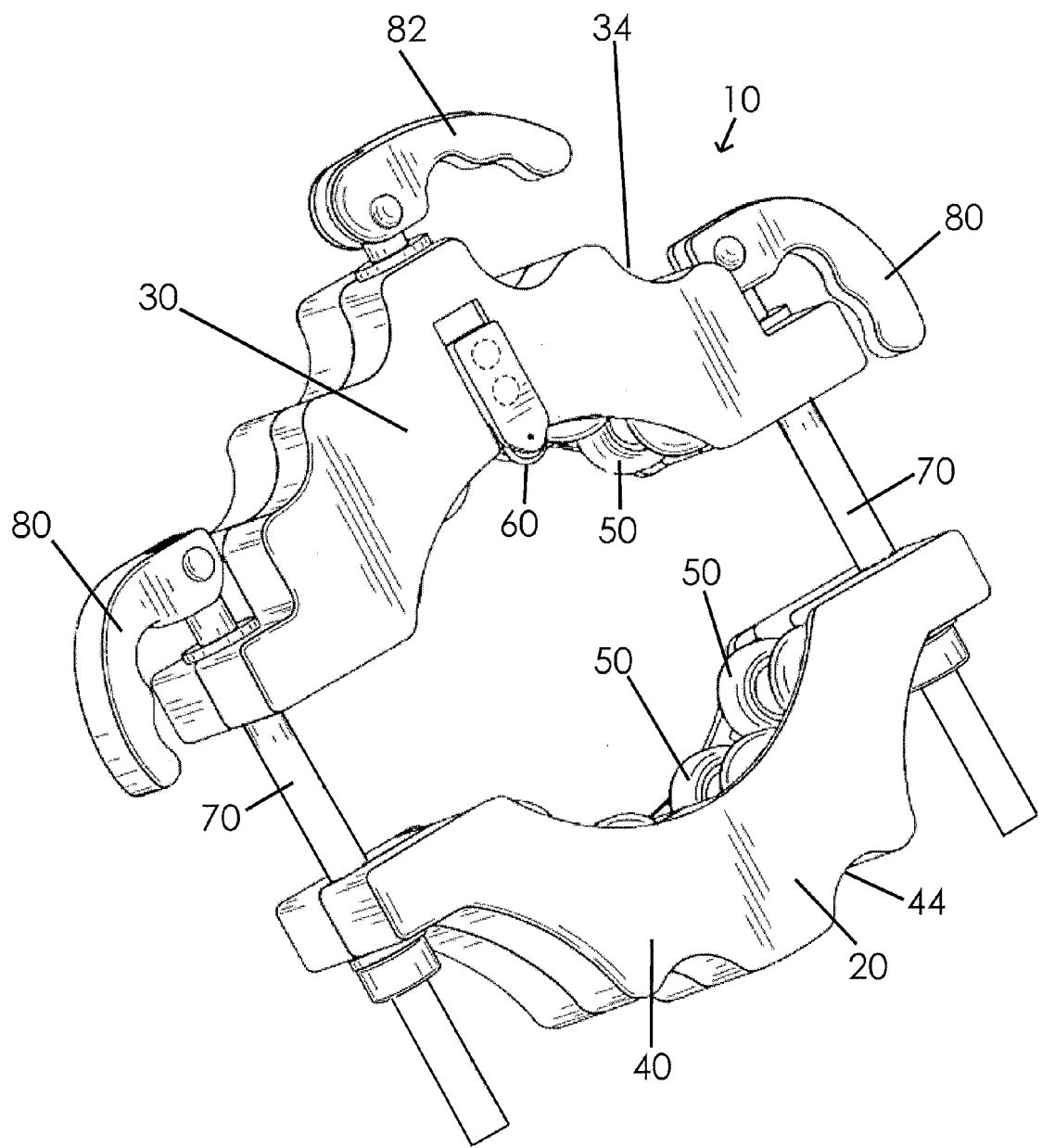
FIG. 9 is a front perspective view of a bottle cutter in accordance with a second embodiment of the present invention.
Figure 10:
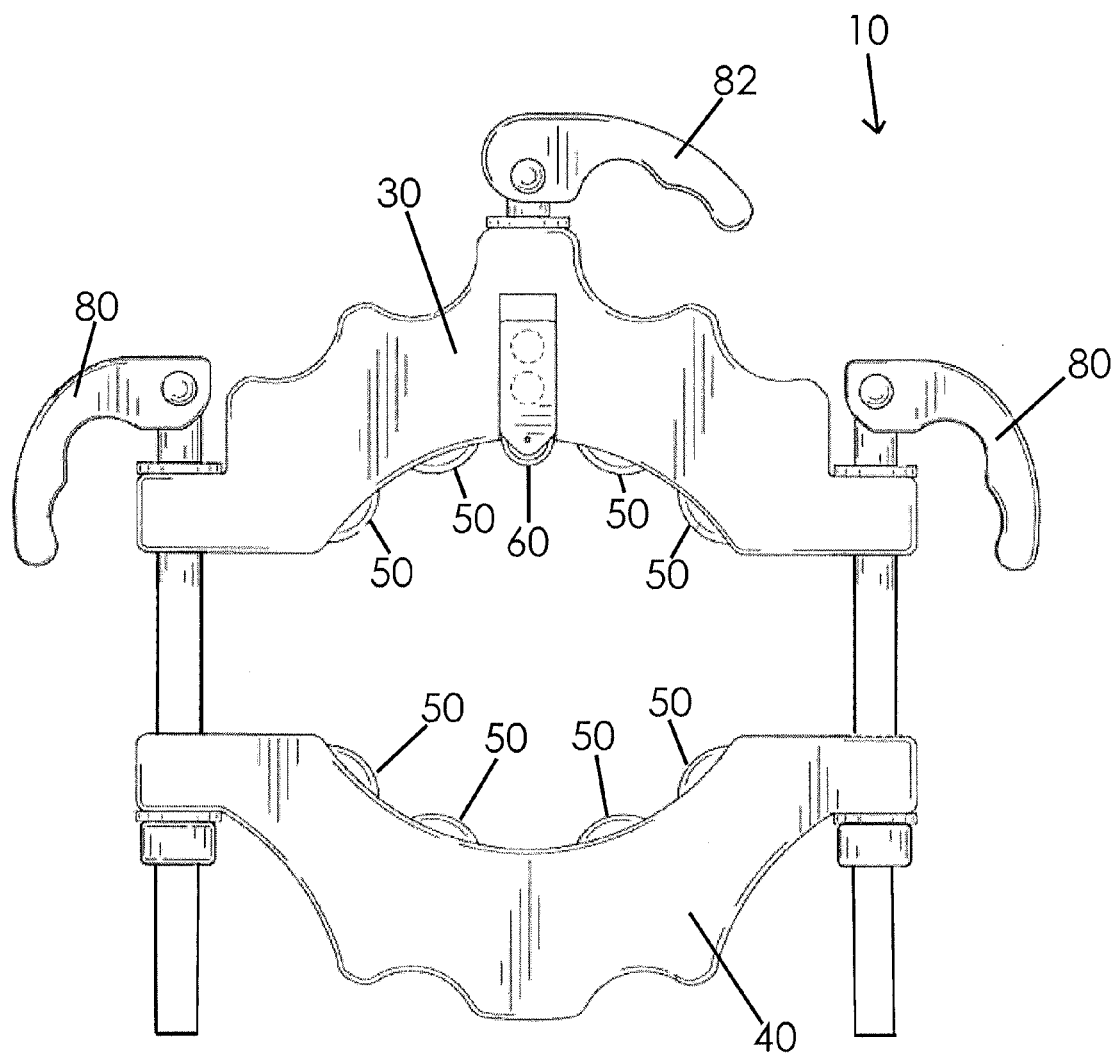
FIG. 10 is a front view of the bottler cutter of FIG. 9.
Figure 11:
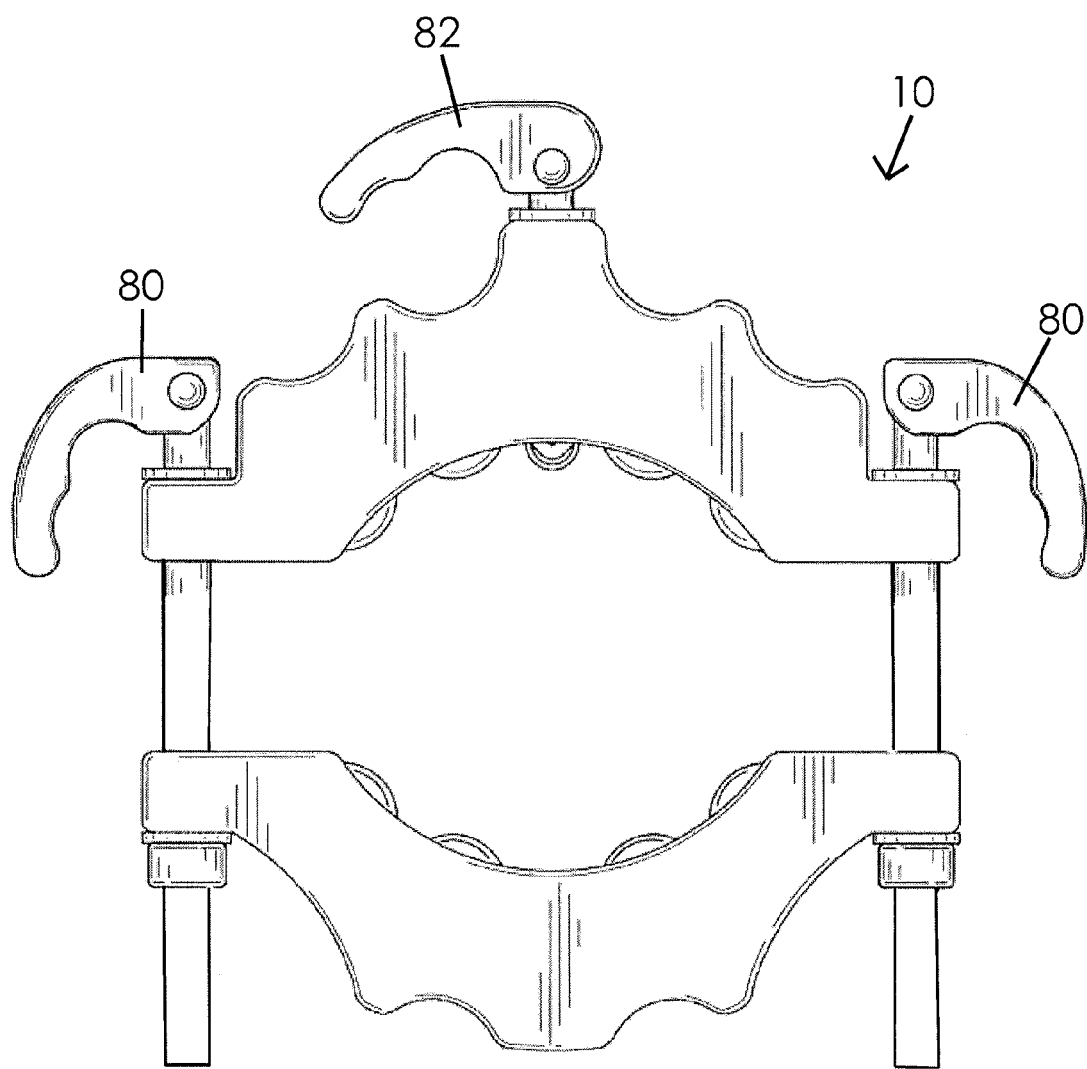
FIG. 11 is a rear view of the bottle cutter of FIG. 9.
Figure 12:
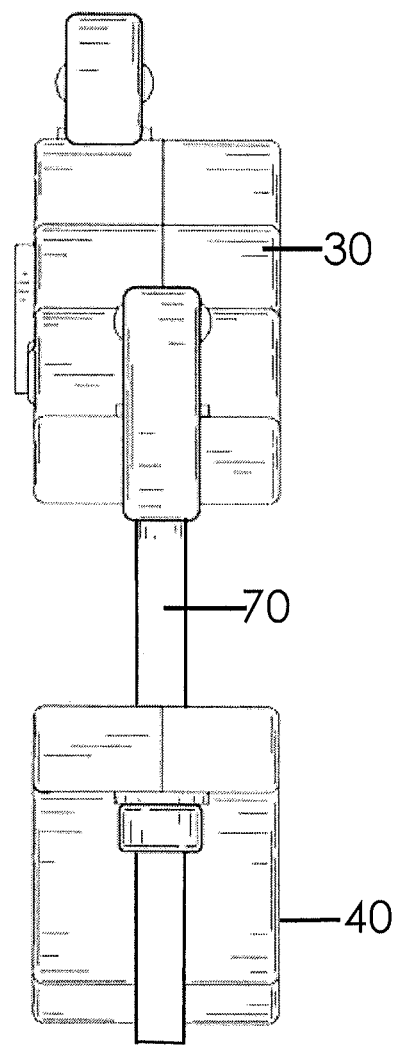
FIG. 12 is a left side view of the bottle cutter of FIG. 9.
Figure 13:
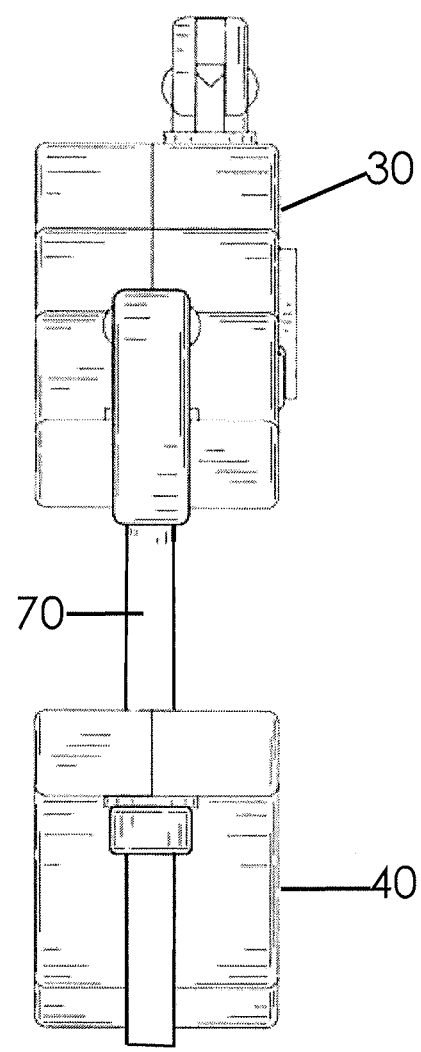
FIG. 13 is a right side view of the bottle cutter of FIG. 9.
Figure 14:
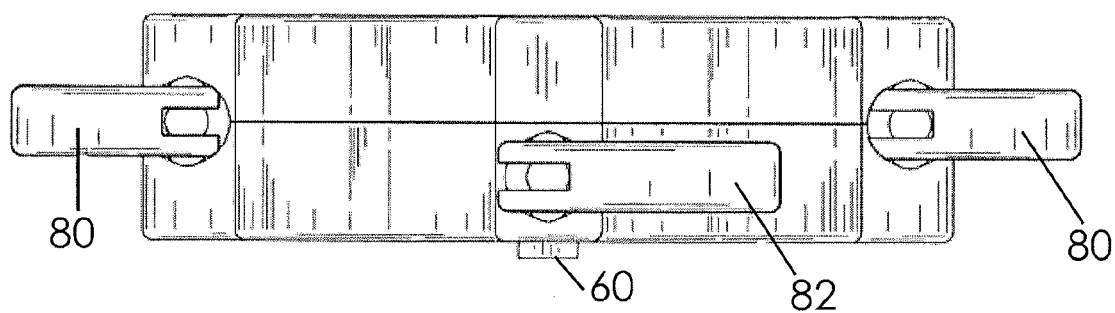
FIG. 14 is a top plan view of the bottle cutter of FIG. 9.
Figure 15:
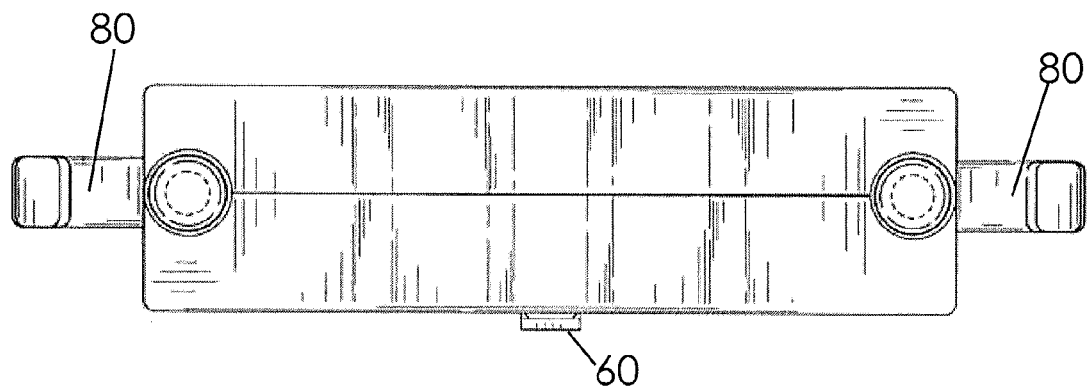
FIG. 15 is a bottom plan view of the bottle cutter of FIG. 9.

FIG. 9 is a front perspective view of a bottle cutter 10 in accordance with a second embodiment of the present invention. As shown in FIGS. 9-15, the bottle cutter 10 in accordance with the second embodiment also has a body 20, first component 30 and second component 40. Notches or indentations 34, 44 may also be provided. The bottle cutter includes wheels or rollers 50 and a cutter 60. The second embodiment also includes straight parallel members 70 permitting one component to slide relative to the other component between an open, non-cutting position and a closed, cutting position. The bottle cutter includes two levers 80 for tightening the bottle cutter around the bottle. A third lever 82 tightens the cutter against the bottle.

Figure 16:
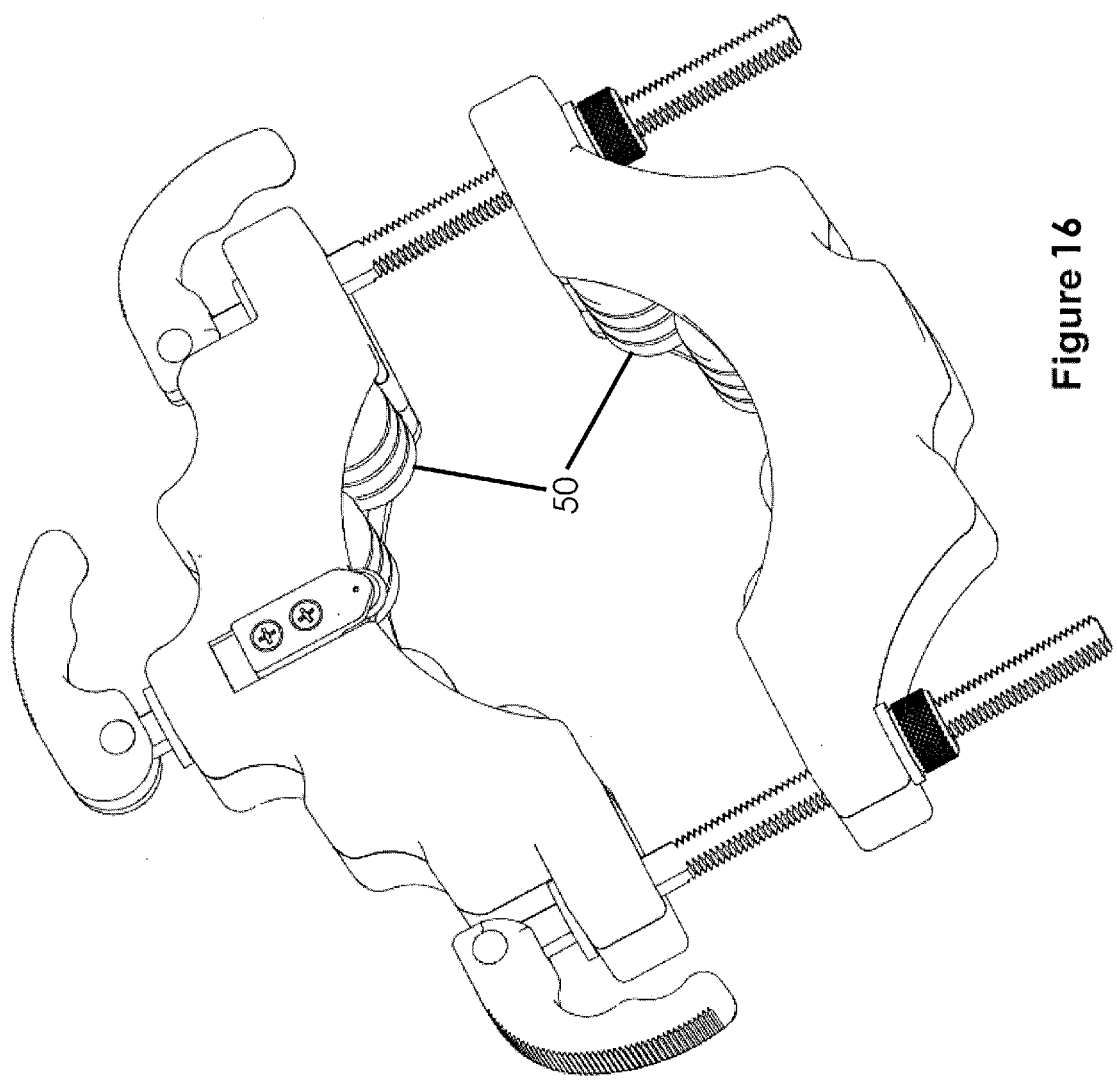
FIG. 16 is a perspective view of a bottle cutter with rollers and a spring-loaded cutter in accordance with a third embodiment of the present invention.
Figure 17:
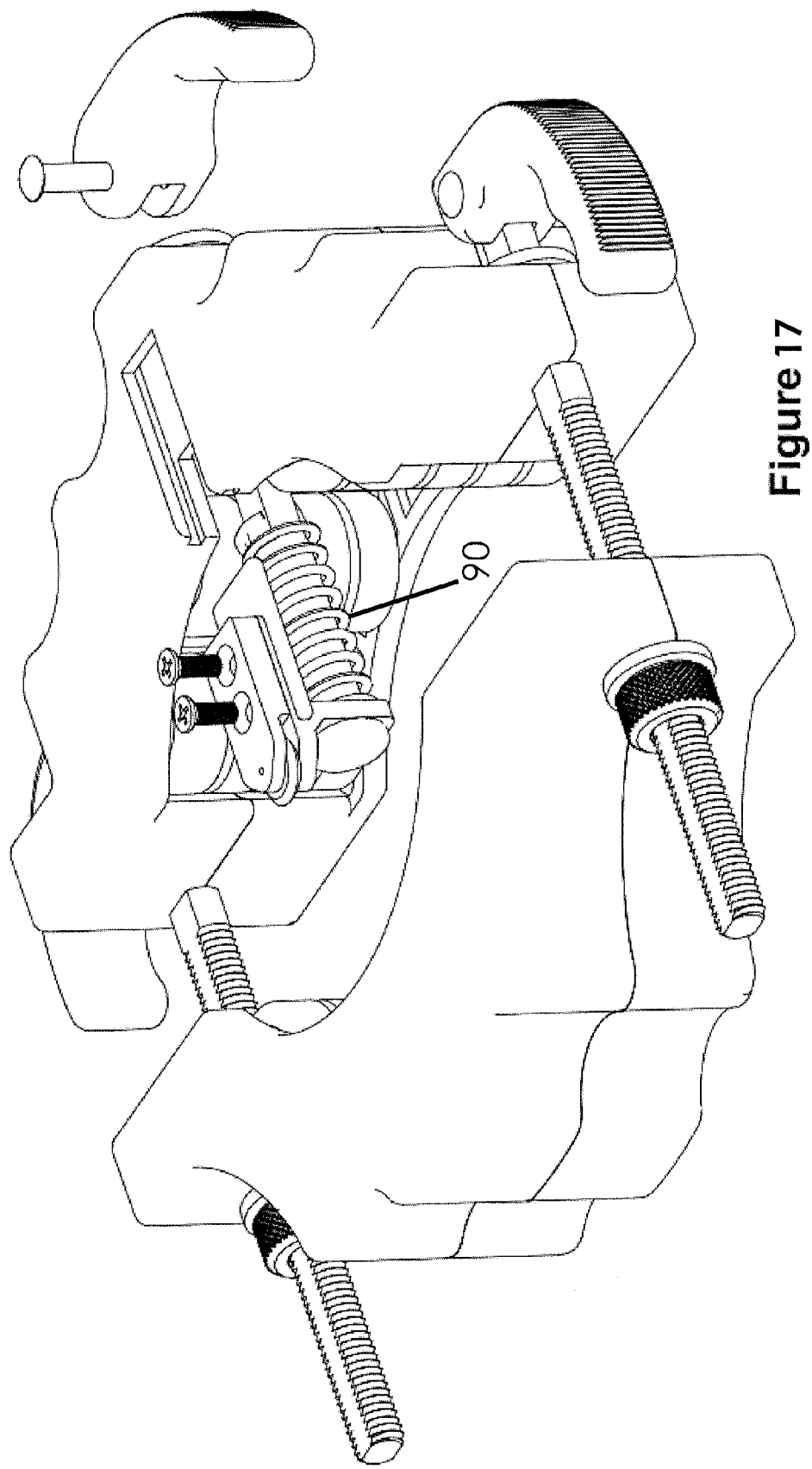
FIG. 17 is an assembly view of the bottle cutter of FIG. 16 showing the spring-loaded cutter.
Figure 18:
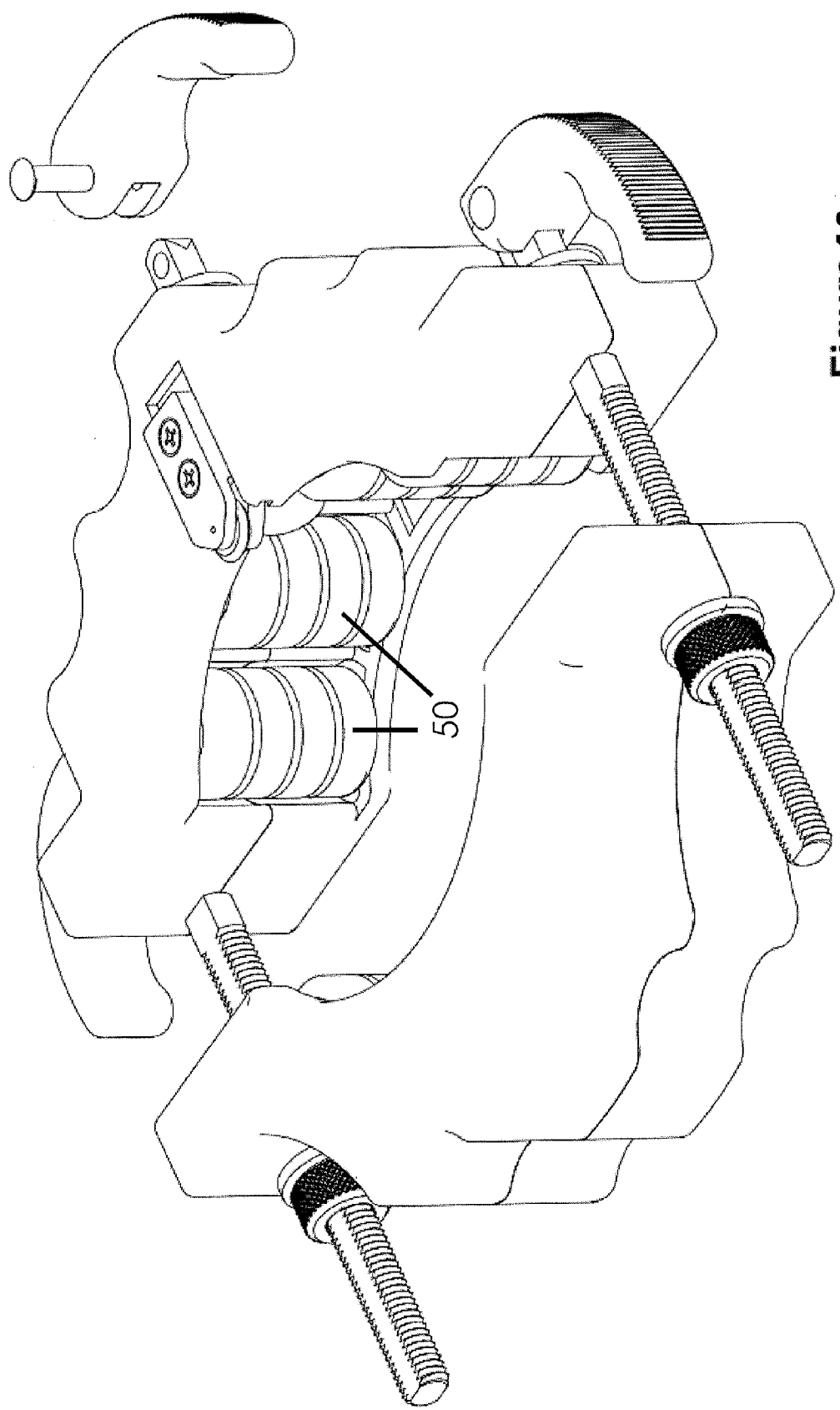
FIG. 18 is another assembly view of the bottle cutter of FIG. 16 showing the rollers.

In a third embodiment depicted by way of example in FIGS. 16-18, the cutter 60 may be spring-loaded. In other words, the bottle cutter may include a spring 90 or other biasing member for mechanically biasing the cutter against the bottle to ensure continuous and uninterrupted cutting contact between the cutter and the bottle. This also accommodates bottles having slight radial irregularities. The bottle cutter shown in FIGS. 16-18 has rollers 50 for rotating the bottle within the bottle cutter.

This novel bottle cutter thus enables a new method of cutting empty glass bottles. This method entails using a bottle cutter having two generally arcuate components that slide relative to one another. The method entails opening the bottle cutter by spreading the arcuate components into an opened, non-cutting position, inserting the bottle into the bottle cutter, and closing the bottle cutter by sliding one component relative to the other component to thereby constrain the bottle in a closed, cutting position. The method further entails scoring the bottle using a cutting wheel attached to one of the components by rotating the bottle with the bottle cutter in the closed, cutting position, separating a top portion of the bottle from a bottom portion of the bottle, and finishing a cut edge of the bottom portion of the bottle.

Separating the top portion from the bottom portion after scoring may be accomplished using cold and hot water to induce differential thermal stresses in the top and bottom portions of the bottle to cleave the top portion from the bottom portion.

Finishing the cut edge to remove any sharpness or burrs may be accomplished by polishing or grinding the edge with sandpaper or any suitable abrasive material.

The bottle cutter may be used to cut a variety of glass or glass-like bottles such as wine bottles, beer bottles, liquor bottles, soft drink bottles, water bottles, etc. In addition, the bottle cutter may be used to cut any other hollow tubular glass or glass-like structure.

The embodiments of the invention described above are intended to be exemplary only. As will be appreciated by those of ordinary skill in the art, to whom this specification is addressed, many obvious variations, modifications, and refinements can be made to the embodiments presented herein without departing from the inventive concept(s) disclosed in this specification. The scope of the exclusive right sought by the applicant is therefore intended to be limited solely by the appended claims.

The invention claimed is:

1. A bottle cutter comprising:
   a first arcuate component;
   a first straight parallel member slidably engaged with the first arcuate component;
   a second straight parallel member slidably engaged with the first arcuate component;
   a second arcuate component slidably engaged with the first straight parallel member and with the second straight parallel member, the first arcuate component and the second arcuate component to slide along the first straight parallel member and the second straight parallel member relative to one another between an open non-cutting position and a closed cutting position;
   a first roller rotatably engaged with the first arcuate component to engage with and facilitate rotation of a bottle held by the bottle cutter in the closed cutting position, wherein the first roller is to engage the bottle substantially continuously when the bottle cutter is in the closed cutting position;
   a second roller rotatably engaged with the second arcuate component to engage with and facilitate rotation of the bottle held by the bottle cutter in the closed cutting position;
   a cutting wheel disposed on the first arcuate component for cutting the bottle as the bottle is rotated, wherein the cutting wheel is translatably repositionable relative to the first arcuate component;
   a spring connected to the cutting wheel to urge the cutting wheel toward the bottle to ensure continuous and uninterrupted cutting contact between the cutting wheel and the bottle;
   a first lever pivotably engaged with the first straight parallel member to approach the first arcuate component toward the second arcuate component to tightly secure the bottle between the first arcuate component and the second arcuate component;
   a second lever pivotably engaged with the second straight parallel member to approach the first arcuate component toward the second arcuate component to tightly secure the bottle between the first arcuate component and the second arcuate component; and
   a third lever pivotable with respect to the bottle, the third lever to push the cutting wheel against the bottle.

2. The bottle cutter as claimed in claim 1 wherein the first arcuate component has flange-like extensions having holes for sliding over the first straight parallel member and the second straight parallel member, and wherein an underside of the flange-like extensions define a plane, and wherein a distance between the plane and the third lever is greater than a distance between the plane and the first lever.

3. The bottle cutter as claimed in claim 1 wherein at least one of the first roller and the second roller is rubberized.

4. The bottle cutter as claimed in claim 1, wherein at least one of the first arcuate component and the second arcuate component comprises at least one finger-receiving notch.

5. The bottle cutter as claimed in claim 1, wherein the cutting wheel is disposed midway between the first straight parallel member and the second straight parallel member.

6. The bottle cutter as claimed in claim 1, wherein the first arcuate component comprises at least two rollers and the cutting wheel is disposed between the two rollers.

7. The bottle cutter as claimed in claim 1, wherein the pushing lever is offset relative to the first pulling lever and the second pulling lever.

8. The bottle cutter as claimed in claim 1, wherein the cutting wheel has a first central axis and the third lever has a second central axis substantially parallel to the first central axis.

9. The bottle cutter as claimed in claim 1, further comprising a first washer about the first straight parallel member between the first pulling lever and the first arcuate component.

10. A method of cutting a bottle, the method comprising:
    providing a bottle cutter having parallel members that define spaced-apart slide rails and first and second arcuate components that slide over the slide rails, wherein the first arcuate component comprises a first roller and wherein the second arcuate component comprises a second roller;
    opening the bottle cutter by spreading the first and second arcuate components into an open non-cutting position by sliding the first arcuate component relative to the second arcuate component over the slide rails;
    inserting the bottle between the first arcuate component and the second arcuate component;
    closing the bottle cutter by sliding the first arcuate component relative to the second arcuate component along the slide rails to engage the first roller and the second roller with the bottle to constrain the bottle in a closed cutting position, wherein closing causes a spring connected to a cutting wheel disposed on and translatably repositionable relative to the first arcuate component to urge the cutting wheel against the bottle to ensure continuous and uninterrupted cutting contact between the cutting wheel and the bottle and the first roller is to engage the bottle substantially continuously when the bottle cutter is in the closed cutting position;
    tightening the first and second arcuate components toward one another around the bottle via first and second levers pivotably engaged with the slide rails;
    tightening the cutting wheel against the bottle via a third lever pivotable with respect to the bottle;
    scoring the bottle using the cutting wheel disposed on the first arcuate component by rotating the bottle with the bottle cutter in the closed cutting position;
    separating a top portion of the bottle from a bottom portion of the bottle; and
    finishing a cut edge of the bottom portion of the bottle.

11. The method as claimed in claim 10, wherein separating comprises using cold and hot water to induce differential thermal stresses in the top and bottom portions of the bottle to cleave the top portion from the bottom portion.

12. The method as claimed in claim 10, wherein finishing comprises polishing the cut edge with an abrasive material.

13. The method as claimed in claim 10, wherein at least one of the first arcuate component and the second arcuate component comprises at least one finger-receiving notch.

14. The method as claimed in claim 10, wherein the cutting wheel is disposed midway between the first straight parallel member and the second straight parallel member.

15. The method as claimed in claim 10, wherein the first arcuate component comprises at least two rollers and the cutting wheel is disposed between the two rollers.

16. The method as claimed in claim 10, wherein the pushing lever is offset relative to the first pulling lever and the second pulling lever.

17. The method as claimed in claim 10, wherein the cutting wheel has a first central axis and the third lever has a second central axis substantially parallel to the first central axis.

18. The method as claimed in claim 10, wherein a first washer is disposed about the first straight parallel member between the first pulling lever and the first arcuate component.

* * * * *